Patented Feb. 15, 1938

2,108,181

UNITED STATES PATENT OFFICE 2,108,181

PROCESS FOR PREPARING ANATOMICAL CASTS OF HUMAN AND ANIMAL ORGANS

August Schummer, Giessen, and Ernst Trommsdorff, Darmstadt, Germany, assignors to Röhm & Haas Company, Philadelphia, Pa., a corporation of Delaware No Drawing. Application January 14, 1936, Serial No. 59,092. In Germany January 15, 1935

5 Claims. (Cl. 35—20)

This invention relates to a method for making casts of the internal structure of human and animal organs and more particularly to the use of a material for making such casts that is fluid enough to penetrate the finest capillaries of the organ so that after the process is completed a perfect cast of all the capillaries and cavities within the organ is produced.

Up to the present there has been no entirely satisfactory method of producing such anatomical casts of human and animal organs for purposes of instruction and research. For lack of a substance sufficiently fluid to penetrate the most intricate recesses and cavities, the anatomical casts hitherto made have been too inaccurate and incomplete.

It has now been found that practically perfect casts of the internal structure of anatomical organs showing the arrangement and size of all the capillaries and cavities can be made by injecting into the veins, arteries or other canals of the organ an organic liquid which is capable of polymerizing to a solid substance, subjecting the material to polymerizing influences until polymerization is complete and then treating the organ with chemicals which will destroy and remove all natural tissue etc. but which will not affect the polymerized material.

The polymerizable liquids which are suitable for the purposes of this invention belong to the class of vinyl compounds and include the lower aliphatic esters of acrylic and methacrylic acids, vinyl acetate, etc. Mixtures of these liquids may also be used. Those compounds which on polymerization yield solid or rubber-like polymers are most satisfactory, and we prefer to use methyl methacrylate, ethyl methacrylate, methyl acrylate and vinyl acetate or mixtures of these. In some cases a higher ester such as butyl acrylate can be used in conjunction with the materials just enumerated. For some purposes it is desirable to employ a liquid having a viscosity somewhat higher than the monomeric material in which case the initial liquid may be partially polymerized before injecting it into the canals of the organ. Other materials such as cellulose esters, cellulose ethers, colophony, etc. may be dissolved in the monomeric liquid to increase its viscosity.

Methyl methacrylate forms the hardest polymer of the materials enumerated above and for this reason is the preferred liquid for injecting into the canals of the organ.

The polymerization of the methyl methacrylate or other polymerizable liquid is carried out by the methods generally known for the polymerization of vinyl compounds. Oxygen yielding substances such as hydrogen peroxide, benzoyl peroxide etc. may be used as catalysts. Substances regulating the polymerization process such as aldehydes, oil of turpentine, solvents etc. can be incorporated with the polymerizable liquid to influence the speed of polymerization to any desired extent as for instance to avoid bubbling and violent reactions of the injected substance.

It is not necessary to maintain any particular temperature while injecting the substance into the organs to be reproduced. The substance fills out all the cavities completely without shrinking to any practical extent during the process of solidification so that it is not necessary to do any supplementary injecting. The solidification of the injected substance is performed by polymerization at temperatures which exclude a deformation of the organs which form the mold. After polymerization the bones and tissues of the organ which has been used as the mold can be destroyed by the action of acids or alkaline substances. Neither of these has an injurious effect on the polymerization product.

The polymerizable material used for injecting into the arteries, etc. may be colored as desired by the use of a small amount of soluble dyestuff. Thus, for any given organ a cast of the arteries may be made with a red material and one of the veins with a blue material. For this purpose two like organs will be necessary, one for the arteries and one for the veins.

It is not possible to give any definite directions for determining the exact end-point of the injection. In filling the arteries, for example, it is possible that some of the material will enter the veins and the only way that the correct filling can be judged is by the skill and experience of the operator. In filling cavities closed at one end it is suggested that a very small opening be made at the point farthest from the point of injection so as to permit escape of air, etc. A syringe with a plunger is recommended and one which does not have too great a diameter. It is also recommended that the syringe be operated by hand so that the operator can become accustomed to the feel of the operation and thus become skilled in judging when the proper end-point has been reached.

The new method has the following advantages over the methods heretofore applied: The viscosity of the susbtance to be injected may be varied easily as described. It is not necessary to do any supplementary injecting. The method permits clean work and is easy to apply. The solidified product is resistant to an extremely high degree against the action of moisture, changes of temperature and against mechanical action. The products are of practically unlimited durability. They show the most intricate recesses and cavities of the organs they reproduce, even vessels of microscopic size can be reproduced properly.

In order that the invention may be fully understood, the following examples are given by way of illustration only.

*Example 1*

Methacrylic acid methyl ester is boiled up with 0.01% of a suitable oxygen producing polymerization catalyst and heated until the fluid has a syrup-like consistency. This material is injected in known manner into the arteries of any desired organ. After completely filling the arteries to be reproduced, the injection opening is bound up and the organ is heated up to a temperature of about 45° C., for example in a water bath, until the injection mass is hardened which generally occurs after 1-2 days. By treating the organ with 25% potassium hydroxide solution to remove the tissue and hydrochloric acid to remove the bony material, if any is present, the clean cast showing the complete structure of the arteries is obtained.

*Example 2*

Methacrylic acid methyl ester, which contains 10 parts by weight of dibutyl phthalate is boiled up with 0.01% of a suitable oxygen producing polymerization catalyst and warmed until the fluid has a syrup-like consistency. The material is used and treated further as described in Example 1.

*Example 3*

Instead of the fluid mentioned in Example 1, a mixture of 60 parts methacrylic acid methyl ester, 15 parts vinyl acetate, 25 parts acrylic acid butyl ester is used as injecting medium.

We claim:—

1. The process for preparing anatomical casts of the interior structure of human and animal organs which comprises filling the canals and cavities of the organ with a polymerizable organic substance capable of forming a hard polymer, solidifying said substance by subjecting it to polymerizing influences and subsequently treating the organ with chemicals which destroy the natural material thereof without affecting the polymerized material.

2. The process for preparing anatomical casts of the interior structure of human and animal organs which comprises filling the canals and cavities of the organ with at least one polymerizable derivative of one of the group consisting of acrylic and methacrylic acids capable of forming a hard polymer, solidifying said derivative by subjecting it to polymerizing influences and subsequently treating the organ with chemicals which destroy the natural material thereof without affecting the polymerized material.

3. The process for preparing anatomical casts of the interior structure of human and animal organs which comprises filling the canals and cavities of the organ with at least one polymerizable derivative of one of the group consisting of acrylic and methacrylic acids capable of forming a hard polymer, solidifying said derivative by heating the organ and its contents to about 45° C. and subsequently treating the organ with chemicals which destroy the natural material thereof without affecting the polymerized material.

4. The process for preparing anatomical casts of the interior structure of human and animal organs which comprises filling the canals and cavities of the organ with a polymerizable substance comprising essentially methyl methacrylate and solidifying said substance by subjecting it to polymerizing influences and subsequently treating the organ with chemicals which destroy the natural material thereof without affecting the polymerized material.

5. The process for preparing anatomical casts of the interior structure of human and animal organs which comprises filling the canals and cavities of the organ with a polymerizable substance comprising essentially a mixture of methyl methacrylate and butyl acrylate and solidifying said substance by subjecting it to polymerizing influences and subsequently treating the organ with chemicals which destroy the natural material thereof without affecting the polymerized material.

AUGUST SCHUMMER.
ERNST TROMMSDORFF.